United States Patent
Sekiya et al.

(10) Patent No.: US 12,261,868 B2
(45) Date of Patent: Mar. 25, 2025

(54) ON-VEHICLE DEVICE AND LOG MANAGEMENT METHOD

(71) Applicant: PANASONIC INTELLECTUAL PROPERTY MANAGEMENT CO., LTD., Osaka (JP)

(72) Inventors: Shoichiro Sekiya, Osaka Fu (JP); Yuishi Torisaki, Osaka Fu (JP); Takayoshi Ito, Osaka Fu (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 198 days.

(21) Appl. No.: 18/101,762

(22) Filed: Jan. 26, 2023

(65) Prior Publication Data

US 2023/0319084 A1 Oct. 5, 2023

(30) Foreign Application Priority Data

Mar. 31, 2022 (JP) .................. 2022-058442

(51) Int. Cl.
- *H04W 4/46* (2018.01)
- *H04L 9/40* (2022.01)
- *H04L 67/12* (2022.01)
- *H04W 4/44* (2018.01)
- *H04W 4/48* (2018.01)

(52) U.S. Cl.
CPC ...... *H04L 63/1425* (2013.01); *H04L 63/1441* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 11,115,425 B2 * | 9/2021 | Ando | H04L 63/1425 |
| 2019/0081960 A1 * | 3/2019 | Kupfer | H04L 63/1416 |
| 2019/0081966 A1 * | 3/2019 | Ploucha | H04L 63/1425 |
| 2019/0182275 A1 * | 6/2019 | Ando | G06F 11/3476 |
| 2020/0053112 A1 * | 2/2020 | Torisaki | H04L 63/1425 |
| 2020/0336504 A1 * | 10/2020 | Maeda | H04W 4/48 |
| 2021/0337387 A1 * | 10/2021 | Ueno | H04W 12/122 |

(Continued)

FOREIGN PATENT DOCUMENTS

| | | |
|---|---|---|
| JP | 2018-032254 | 3/2018 |
| JP | 2019152539 A * | 9/2019 |

*Primary Examiner* — Venkat Perungavoor
(74) *Attorney, Agent, or Firm* — Greenblum and Bernstein, P.L.C.

(57) ABSTRACT

An on-vehicle device according to the present disclosure is capable of communicating with a server and mounted on a vehicle. The on-vehicle device includes a memory, and a hardware processor coupled to the memory. The hardware processor is configured to: receive, from the server, a log acquisition requirement including an anomaly detected point portion that designates one or more anomaly detected points and a log acquisition target portion that indicates one or more logs to be acquired when an anomaly is detected at the one or more anomaly detected points designated by the anomaly detected point portion; store the log acquisition requirement; detect an anomaly of the vehicle; acquire, when detecting an anomaly, a log based on a part where an anomaly is detected and the log acquisition requirement; and transmit the acquired log to the server.

16 Claims, 11 Drawing Sheets

(56) References Cited

U.S. PATENT DOCUMENTS

| | | | | |
|---|---|---|---|---|
| 2021/0360008 A1* | 11/2021 | Moriya | .................... | H04L 12/40 |
| 2022/0017041 A1* | 1/2022 | Imoto | ................. | B60R 25/2009 |
| 2022/0019661 A1* | 1/2022 | Nagara | ................. | G06F 21/554 |
| 2022/0103583 A1* | 3/2022 | Torisaki | .............. | H04L 63/1441 |
| 2022/0121513 A1* | 4/2022 | Shibayama | ......... | G06F 11/0727 |
| 2023/0327956 A1* | 10/2023 | Matsubayashi | ....... | H04L 41/145 |
| | | | | 370/254 |
| 2023/0367664 A1* | 11/2023 | Li | .................... | B60W 50/0205 |

* cited by examiner

FIG.2

| ANOMALY DETECTION PATTERN | LOG ACQUISITION TARGET |
|---|---|
| ECU3, ECU4 | ECU1, ECU2, ECU3, ECU4 |

FIG.3

| ANOMALY DETECTION PATTERN | LOG ACQUISITION TARGET | PRIORITY LEVEL (NUMBER OF TIMES RECEPTION IS MADE) |
|---|---|---|
| ECU3, ECU4 | ECU1, ECU2, ECU3, ECU4 | 4→5 |
| ECU3, ECU4 | ECU2, ECU3, ECU4 | 2 |
| ECU3, ECU4 | ECU1, ECU3, ECU4, ECU5 | 1 |
| ECU1, ECU5 | ECU1, ECU2, ECU4, ECU5 | 1 |
| ⋮ | ⋮ | ⋮ |

FIG.8A

| MODIFIED PATTERN | | ANOMALY DETECTION PATTERN |
|---|---|---|
| BASIC | ECU ONLY | ECU3, ECU4 |
| 1 | ECU+ANOMALY TYPE | ECU3 - APPLICATION UPDATE ERROR, ECU4 - UNAUTHORIZED CONTROL COMMUNICATION |
| 2 | ANOMALY TYPE ONLY | APPLICATION UPDATE ERROR, UNAUTHORIZED CONTROL COMMUNICATION |

FIG.8B

| MODIFIED PATTERN | | LOG ACQUISITION TARGET |
|---|---|---|
| BASIC | ECU ONLY | ECU1, ECU2, ECU3, ECU4 |
| 1 | ECU+LOG TYPE | ECU1 - Firewall LOG, ECU2 - Ethernet LOG, ECU3 - UPDATE APPLICATION LOG, ECU4 - CAN LOG |
| 2 | LOG TYPE ONLY | Firewall LOG, Ethernet LOG, UPDATE APPLICATION LOG, CAN LOG |

FIG.9A

| ANOMALY DETECTION PATTERN | LOG ACQUISITION TARGET | CONTROL MSG |
|---|---|---|
| ECU3, ECU4 | ECU1, ECU2, ECU3, ECU4 | DELETE |

FIG.9B

| | ANOMALY DETECTION PATTERN | LOG ACQUISITION TARGET | PRIORITY LEVEL |
|---|---|---|---|
| DELETE | ECU3, ECU4 | ECU1, ECU2, ECU3, ECU4 | |

FIG.10A

| ANOMALY DETECTION PATTERN | LOG ACQUISITION TARGET | RELIABILITY LEVEL |
|---|---|---|
| ECU3, ECU4 | ECU1, ECU2, ECU3, ECU4 | 80 |

FIG.10B

| ANOMALY DETECTION PATTERN | LOG ACQUISITION TARGET | PRIORITY LEVEL (SUM OF RELIABILITY LEVELS) |
|---|---|---|
| ECU3, ECU4 | ECU1, ECU2, ECU3, ECU4 | 80→160 |

FIG.11A

| ANOMALY DETECTION PATTERN | LOG ACQUISITION TARGET | PRIORITY LEVEL |
|---|---|---|
| * | ECU1, ECU2 | HIGHEST PRIORITY |

FIG.11B

| ANOMALY DETECTION PATTERN | LOG ACQUISITION TARGET | CONTROL MSG | PRIORITY LEVEL |
|---|---|---|---|
| ECU3, ECU4 | ECU1, ECU2, ECU3, ECU4 | DESIGNATE PRIORITY LEVEL | HIGHEST PRIORITY |
| ECU3, ECU4 | ECU1, ECU3, ECU4, ECU5 | DESIGNATE PRIORITY LEVEL | HIGHEST PRIORITY |

ON-VEHICLE DEVICE AND LOG MANAGEMENT METHOD

CROSS-REFERENCE TO RELATED APPLICATIONS

This application is based upon and claims the benefit of priority from Japanese Patent Application No. 2022-058442, filed on Mar. 31, 2022, the entire contents of which are incorporated herein by reference.

FIELD

The present disclosure relates to an on-vehicle device and a log management method.

BACKGROUND

In recent years, there has been a technique for collecting anomaly detection information and log information from a vehicle (e.g., JP 2018-032254 A). The technique allows to collect log information for the cause and countermeasure of the anomaly occurrence due to the cyber-attack on the vehicle.

For example, when the pattern of the above cyber-attack is changed, even if the same type of log information is simply and uniformly collected, appropriate log information cannot be collected.

It is an object of the present disclosure to collect appropriate log information.

SUMMARY

An on-vehicle device according to the present disclosure is capable of communicating with a server and mounted on a vehicle. The on-vehicle device includes a memory, and a hardware processor coupled to the memory. The hardware processor is configured to: receive, from the server, a log acquisition requirement including an anomaly detected point portion that designates one or more anomaly detected points and a log acquisition target portion that indicates one or more logs to be acquired when an anomaly is detected at the one or more anomaly detected points designated by the anomaly detected point portion; store the log acquisition requirement; detect an anomaly of the vehicle; acquire, when detecting an anomaly, a log based on a part where an anomaly is detected and the log acquisition requirement; and transmit the acquired log to the server.

BRIEF DESCRIPTION OF THE DRAWINGS

FIG. 2 is a diagram illustrating an example of a log acquisition requirement according to the present embodiment;

FIG. 3 is a diagram illustrating an example of data stored by a management unit according to the present embodiment;

FIG. 8A is a diagram for explaining an example of an anomaly detection pattern according to the modification;

FIG. 8B is a diagram for explaining an example of a log acquisition target according to the modification;

FIG. 9A is a diagram illustrating an example of a control message according to the modification;

FIG. 9B is a diagram illustrating an example in which control is performed according to a control message according to the modification;

FIG. 10A is a diagram illustrating an example of a log acquisition requirement according to the modification;

FIG. 10B is a diagram illustrating an example of changing a priority level according to the modification;

FIG. 11A is a diagram illustrating an example of a log acquisition requirement according to the modification; and FIG. 11B is a diagram illustrating an example of a log acquisition requirement according to the modification.

DETAILED DESCRIPTION

Embodiment

Embodiments will be described with reference to the drawings.

System Configuration Example

Figure 1:
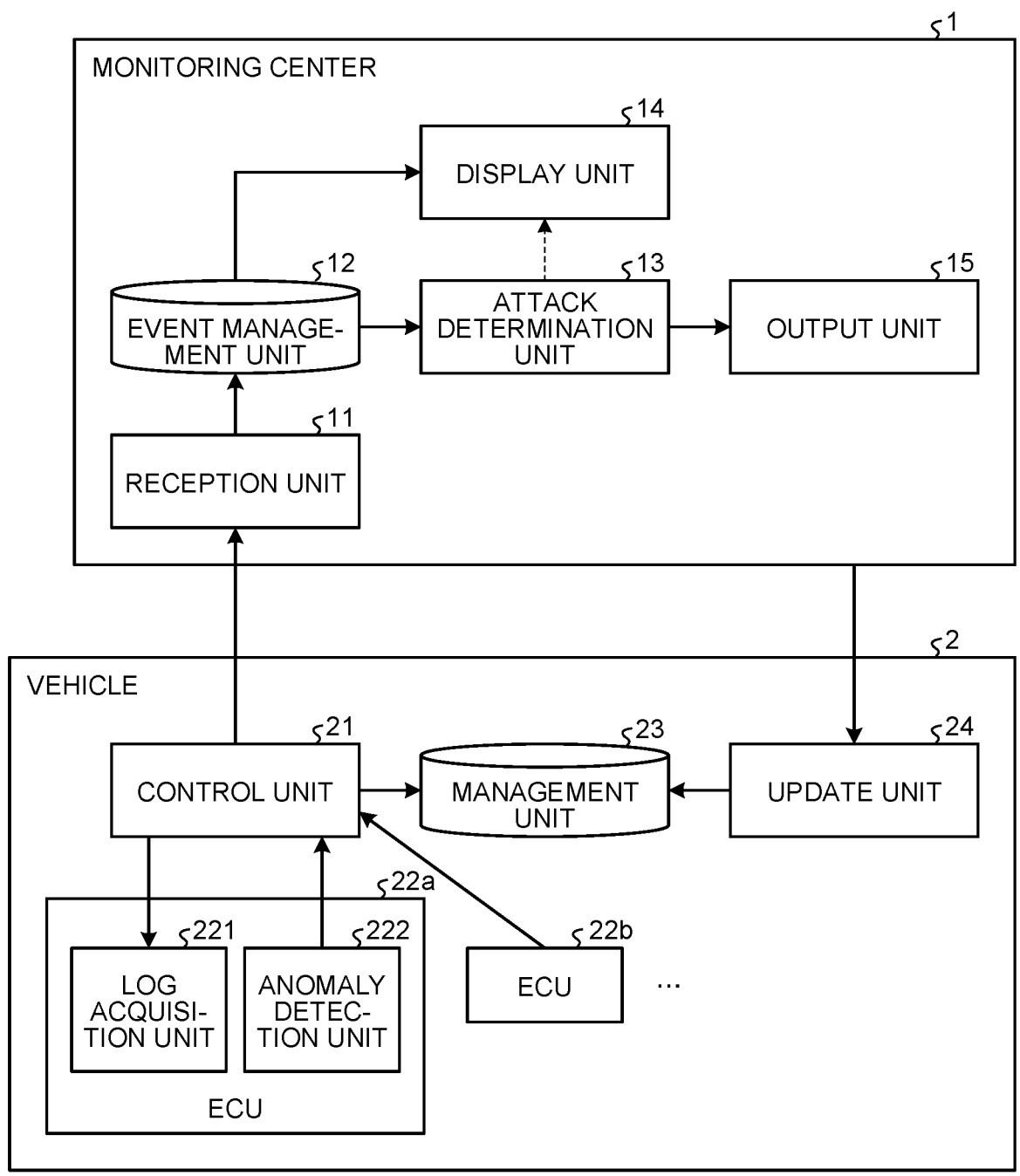
FIG. 1 is a schematic configuration diagram illustrating an example of a system according to a present embodiment.

FIG. 1 is a schematic configuration diagram illustrating an example of a system according to an embodiment. The system includes a monitoring center 1 and a vehicle 2. The monitoring center 1 and the vehicle 2 can transmit and receive information to and from each other via a network.

The monitoring center 1 is a system that manages the state of a plurality of vehicles 2. The monitoring center 1 is an information processing device such as a server device. The monitoring center 1 acquires information on anomaly detection from the vehicle 2, identifies a part of attack based on the content of the anomaly detection, and determines a log acquisition target according to the part of attack. The monitoring center 1 transmits the part of attack and the log acquisition target to the vehicle 2. Thus, the monitoring center 1 can instruct the vehicle 2 of the type of the log to be acquired.

The vehicle 2 controls the driving operation of the vehicle 2. The vehicle 2 includes a plurality of electronic control units (ECUs), monitors the plurality of ECUs, acquires log information if an anomaly is detected, and transmits the log information to the monitoring center 1. The vehicle 2 acquires log information based on the type of the log to be acquired acquired from the monitoring center 1.

The monitoring center 1 includes a reception unit 11, an event management unit 12, an attack determination unit 13, a display unit 14, and an output unit 15. The reception unit 11 receives information related to anomaly detection (event) from the vehicle 2. The reception unit 11 acquires, as the information related to the anomaly detection, the type of the ECU in which an anomaly has occurred and the log information of the ECU in which an anomaly has occurred, and others.

The event management unit 12 is a storage means that stores information acquired from the vehicle 2. The attack determination unit 13 identifies an attack pattern based on the information stored in the event management unit 12. For example, when anomaly detection of ECU3 and ECU 4 is received from the vehicle 2, the attack determination unit 13 identifies ECU1→ECU2→ECU3→ECU4 as an attack path based on the connection relationship between the ECUs, for example. Note that a known technique can be applied to a method of identifying an attack path.

The display unit 14 is a display means that displays various kinds of information. The display unit 14 displays information stored in the event management unit 12 or displays a determination result by the attack determination unit 13.

The output unit 15 transmits, to the vehicle, a log acquisition requirement indicating a log acquisition target based on a determination result by the attack determination unit 13. An example of the log acquisition requirement data transmitted by the output unit 15 will be described here with reference to FIG. 2. The data transmitted by the output unit 15 is an example of the log acquisition requirement. The output unit 15 transmits, to the vehicle 2, an anomaly detection pattern and the log acquisition target based on the anomaly detection pattern as the log acquisition requirement data.

Returning to FIG. 1, the vehicle 2 includes a control unit 21, an ECU 22, a management unit 23, and an update unit 24. The control unit 21, the ECU 22, the management unit 23, and the update unit 24 are mounted on the vehicle. Therefore, the control unit 21, the ECU 22, the management unit 23, and the update unit 24 are examples of on-vehicle devices. The control unit 21 controls a plurality of ECUs 22 (e.g., ECU 22a, ECU 22b, . . . ). The control unit 21 is, for example, an ECU that provides a security function. When the control unit 21 receives information indicating that an anomaly has been detected from the ECU 22, the control unit identifies a log acquisition target based on the content managed by the management unit 23, acquires log information of the log acquisition target, and transmits the log information to the monitoring center 1. Note that each device may be an individual device, or may be a device having a plurality of functions, such as a device in which the control unit 21, the management unit 23, and the update unit 24 may be included in one same device.

The ECU 22 includes a log acquisition unit 221 and an anomaly detection unit 222. The log acquisition unit 221 acquires log information in response to an instruction from the control unit 21. The anomaly detection unit 222 detects an anomaly that has occurred in the ECU 22. When the anomaly is detected, the anomaly detection unit 222 transmits the information indicating that the anomaly has been detected to the control unit 21.

The management unit 23 is a storage means that manages the log acquisition requirement data received from the monitoring center 1. An example of the log acquisition requirement data stored by the management unit 23 will be described here with reference to FIG. 3. As illustrated in FIG. 3, the management unit 23 stores an anomaly detection pattern, a log acquisition target, and a priority level. The priority level here is, for example, the number of times the log acquisition requirement data of the same combination of the anomaly detection pattern and the log acquisition target is received.

Returning to FIG. 1, the update unit 24 stores the log acquisition requirement data received from the monitoring center 1 in the management unit 23. Note that the update unit 24 may edit the log acquisition requirement data stored in the management unit 23.

Figure 4:
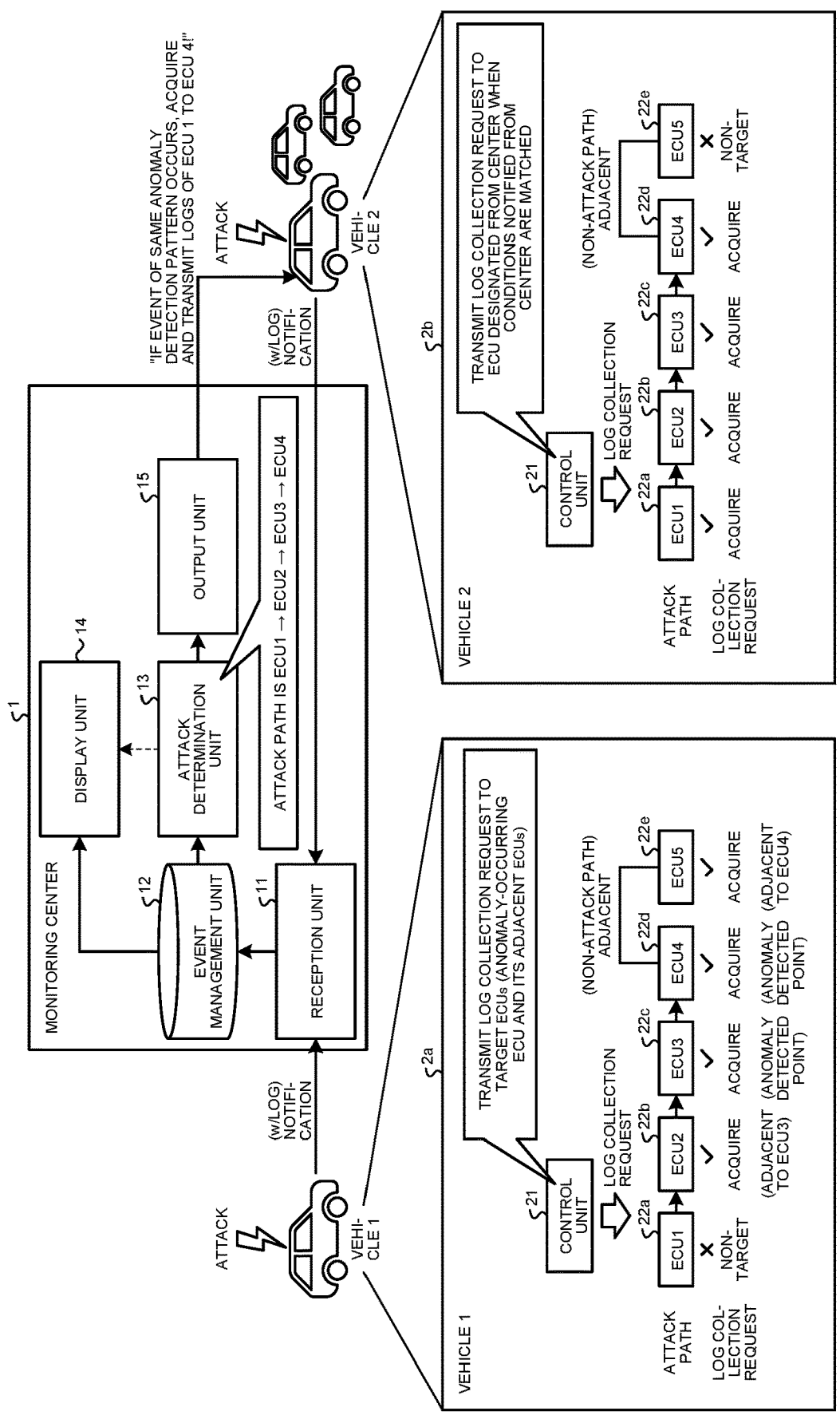
FIG. 4 is a diagram for explaining a log collection method according to the present embodiment.

A log collection method of the monitoring center 1 will be subsequently described with reference to FIG. 4. In a vehicle 2a, when the log acquisition requirement is undefined, an anomaly-occurring ECU and its adjacent ECUs are targeted for log acquisition. The vehicle 2a first detects abnormalities in the ECU 22c and ECU 22d. In the vehicle 2a, if abnormalities are detected in the ECU 22c and ECU 22d (ECU3 and ECU4), the control unit 21 of the vehicle 2a acquires log information of the ECU 22b, ECU 22c, ECU 22d and ECU 22e based on the above conditions. The control unit 21 of the vehicle 2a transmits, to the monitoring center 1, information indicating that abnormalities have been detected in the ECU 22c and ECU 22d (anomaly detected points) and log information of the ECU 22b, ECU 22c and ECU 22d.

The monitoring center 1 receives anomaly detected points and log information based on the anomaly detected points from the vehicle 2a. The monitoring center 1 refers to the anomaly detected points received from the vehicle 2a or the other vehicle 2 and the log information based on the anomaly detected points, and determines an attack path. If the monitoring center 1 determines that the attack path is the ECU1→ECU2→ECU3→ECU4, when the anomaly detection patterns (anomaly detected points) are the ECU3 and ECU4, the monitoring center transmits, to the vehicle 2 (e.g., a vehicle 2b), the log acquisition requirement data indicating that the log acquisition targets are the ECU1 to ECU4.

In the vehicle 2b, if abnormalities are detected in the ECU 22c and ECU 22d, when the priority level of the log acquisition requirement of which the log acquisition target is the ECU1 to ECU4 is the highest, that is, when the number of times the log acquisition requirement is received from the monitoring center 1 is the largest, among the log acquisition requirements of which the anomaly detection patterns are the ECU3 and ECU4, the control unit 21 of the vehicle 2b acquires the log information from the ECU1 to ECU4.

Figure 5:
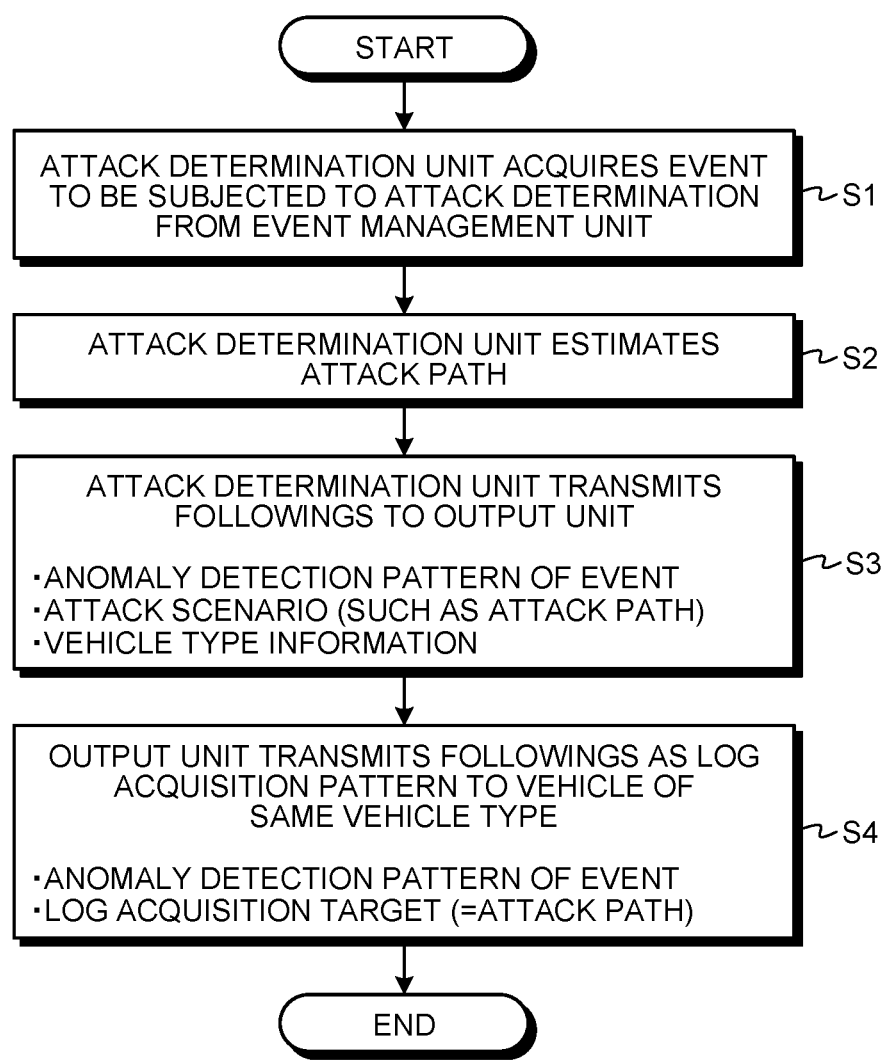
FIG. 5 is a flowchart illustrating a log acquisition requirement generation processing procedure according to the present embodiment.

A processing procedure in which the monitoring center 1 generates a log acquisition requirement will be subsequently described with reference to FIG. 5. FIG. 5 is a flowchart illustrating a log acquisition requirement generation processing procedure.

It is assumed that the event management unit 12 stores an event in which an anomaly detected point and log information are associated with each other. The attack determination unit 13 first acquires an event to be subjected to attack determination from the event management unit 12 (step S1). The attack determination unit 13 subsequently estimates an attack path based on the event (step S2). The attack determination unit 13 outputs the anomaly detection pattern of the event, the attack path, and vehicle type information to the output unit 15 (step S3).

The output unit 15 transmits the anomaly detection pattern and the log acquisition target (attack path) as the log acquisition requirement to the vehicle 2 which is the vehicle type corresponding to the received vehicle type information (Step S4). Note that the update unit 24 of the vehicle 2 receives the log acquisition requirement and stores the received log acquisition requirement in the management unit 23.

Figure 6:
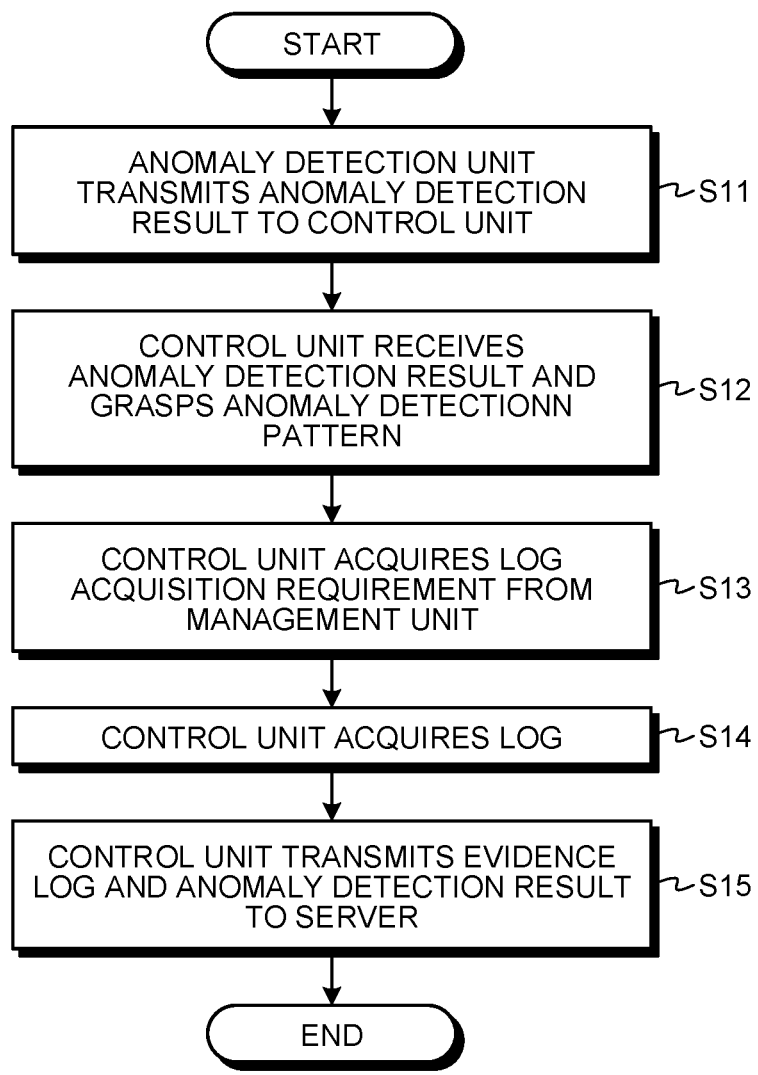
FIG. 6 is a flowchart illustrating a log information acquisition processing procedure.

A processing procedure in which the vehicle 2 acquires log information based on a log acquisition requirement will be subsequently described with reference to FIG. 6. FIG. 6 is a flowchart illustrating a log information acquisition processing procedure.

The anomaly detection unit 222 transmits information indicating that an anomaly has been detected (anomaly detection result) to the control unit 21 (step S11). The control unit 21 receives the anomaly detection result and grasps an anomaly detection pattern (step S12). The control unit 21 refers to the management unit 23 and acquires a log acquisition requirement having the highest priority level, that is, having the largest number of times reception is made, among the log acquisition targets corresponding to the anomaly detection pattern (step S13).

The control unit 21 acquires the log information of the log acquisition target of the acquired log acquisition requirement (step S14), and transmits the anomaly detection result and the log information to the monitoring center 1 (step S15).

In the above-described embodiment, the vehicle 2 receives a log acquisition requirement including the anomaly detection pattern and the log acquisition target, and stores the log acquisition requirement. If an anomaly of the vehicle 2 is detected, the vehicle 2 acquires a log based on the log acquisition requirement corresponding to the detected anomaly, and transmits the acquired log to the monitoring center 1.

As described above, the vehicle 2 stores the log acquisition requirement in advance and acquires a log based on the log acquisition requirement corresponding to the detected anomaly, and thus can collect appropriate log information.

Modification

Figure 7A:
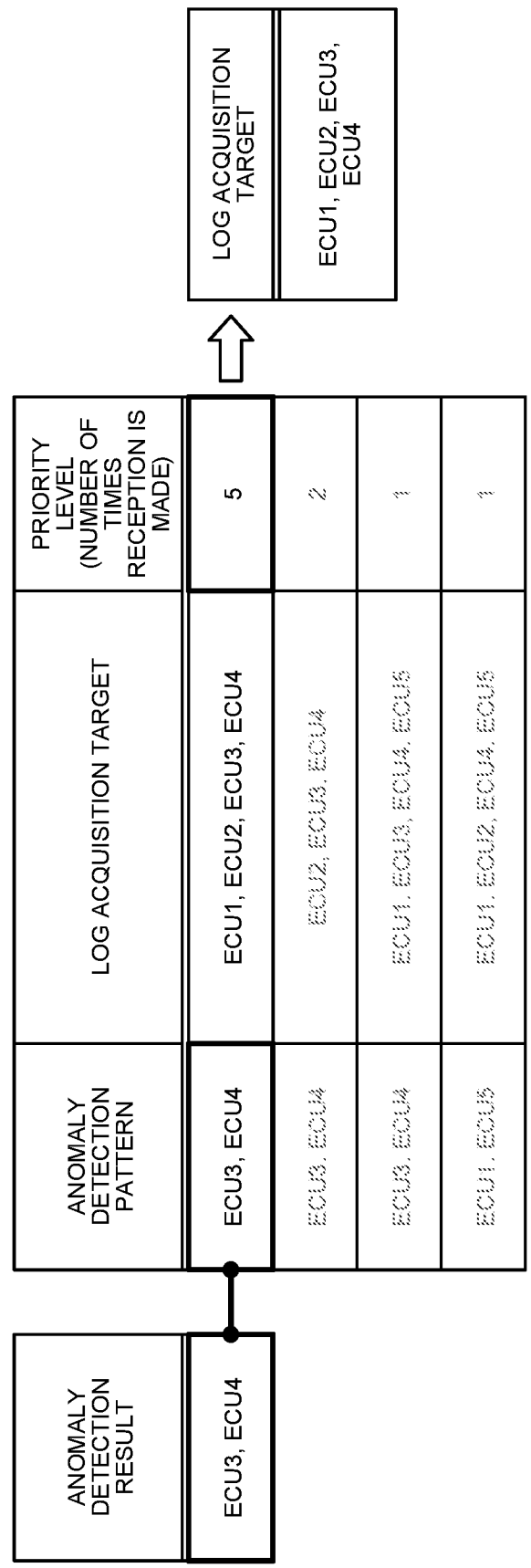
FIG. 7A is a diagram for explaining a log acquisition target determination method according to the present embodiment.

Note that, in the above-described embodiment, as illustrated in FIG. 7A, if abnormalities are detected in ECU3 and ECU4, the vehicle 2 refers to the management unit 23 and acquires a log acquisition requirement having the largest number of times reception is mage among the log acquisition targets corresponding to the anomaly detection pattern. Note that, although not limited to the above, the vehicle 2 may acquire the logs of the log acquisition targets of the log acquisition requirements having the number of times reception is made being up to the top N-th (e.g., third) among the log acquisition targets corresponding to the anomaly detection pattern.

Figure 7B:
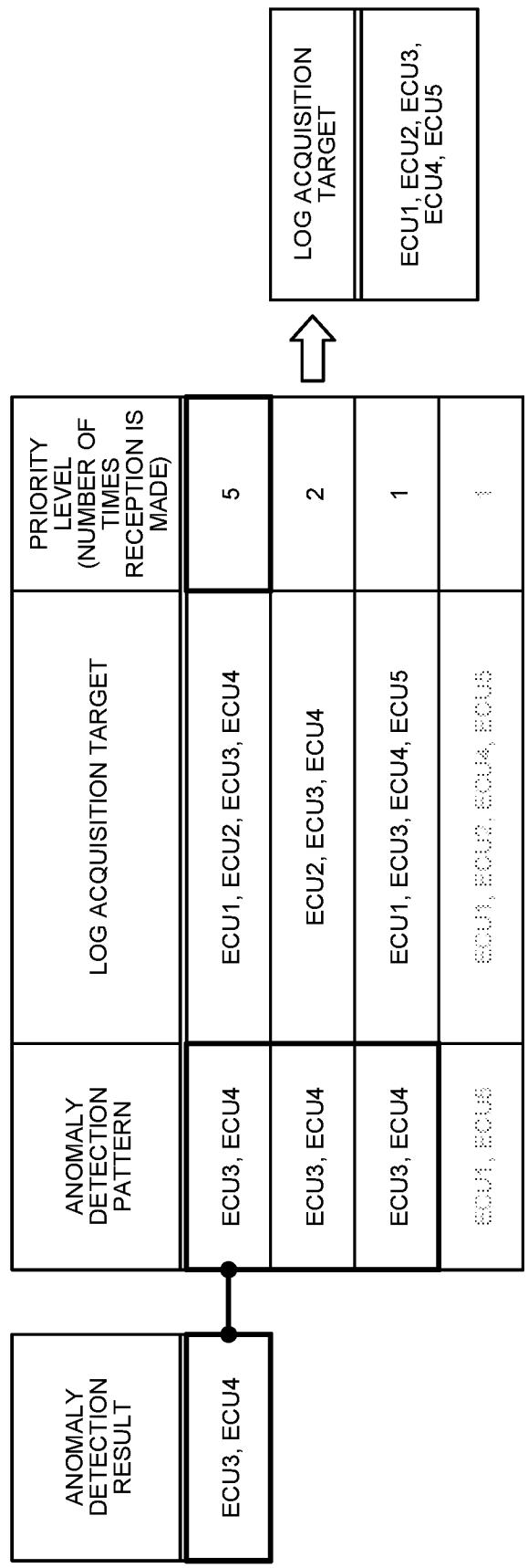
FIG. 7B is a diagram for explaining a log acquisition target determination method according to a modification.

For example, as illustrated in FIG. 7B, the vehicle 2 may refer to the log acquisition requirements of which the number of times reception is made is up to the third among the log acquisition targets corresponding to the anomaly detection pattern, and set the log acquisition targets to the ECU1 to ECU5.

In the above-described embodiment, although the case where the vehicle 2 transmit the ECU 22 in which an anomaly has been detected as the anomaly detection pattern to the monitoring center 1 has been described, information on the anomaly type may be transmitted as the anomaly detection pattern. The monitoring center 1 may identify an attack pattern based on an anomaly detection pattern including information on the anomaly type acquired from the vehicle 2, and identify the log acquisition target corresponding to the attack pattern.

An example of an anomaly detection pattern is illustrated here in FIG. 8A. As illustrated in FIG. 8A, the anomaly detection pattern is not limited to a pattern of an ECU only, and may be a pattern in which an anomaly type is added to the ECU. The anomaly detection pattern may be a pattern of an anomaly type only.

In the above-described embodiment, the case where the monitoring center 1 sets the log acquisition target to an ECU has been described, but other information may be set as the log acquisition target. An example of a log acquisition target is illustrated here in FIG. 8B. As illustrated in FIG. 8B, the log acquisition target is not limited to a target of an ECU only, and may be a target in which a log type is added to the ECU. The log acquisition target may be a target of a log type only.

Although not particularly described in the above-described embodiment, the monitoring center 1 may output a control message for the log acquisition requirement. An example of a control message is illustrated here in FIG. 9A. The control message is data in which an anomaly detection pattern, a log acquisition target, and a control MSG are associated with each other. The control MSG indicates a control processing content, and indicates a deletion instruction in the example of FIG. 9A. When the monitoring center 1 transmits the control message illustrated in FIG. 9A, the vehicle 2 receives the above control message, and the update unit 24 of the vehicle 2 deletes the log acquisition requirement corresponding to the anomaly detection pattern and the log acquisition target of the control message, as illustrated in FIG. 9B, based on the control message.

As described above, the monitoring center 1 transmits the control message and causes the vehicle 2 to edit the log acquisition requirement that is assumed to be unnecessary and thereby can leave only the appropriate log acquisition requirement in the vehicle 2. Note that the control processing content of the control message may be, in addition to the deletion instruction, designation of priority level or switching of algorithm. The switching of algorithm is to switch a log acquisition target determination algorithm.

In the above-described embodiment, the case where the vehicle 2 stores the number of times reception is made in the log acquisition requirement has been described, but the monitoring center 1 may transmit information added with reliability level to the vehicle 2 as illustrated in FIG. 10A. The vehicle 2 may add the acquired reliability level to the priority level of the record of the stored anomaly detection pattern and log acquisition target.

As described above, the system sets a reliability level to the combination of the anomaly detection pattern and the log acquisition target, so that the vehicle 2 can select the most appropriate log acquisition target for the anomaly detection pattern based on the reliability level.

Although the case where the monitoring center 1 sets the combination of the anomaly detection pattern and the log acquisition target by determining an attack pattern has been described, the combination may be defined by an operator of the monitoring center 1. For example, as illustrated in FIG. 11A, the operator of the monitoring center 1 may define, for all anomaly detection patterns, a log acquisition requirement in which the log acquisition target is the ECU1 and ECU2 and the priority level is the highest priority.

In this case, the log acquisition requirement set by the operator can also be transmitted, and a more comprehensive log acquisition requirement can be provided to the vehicle 2. Alternatively, providing a log acquisition requirement in which a log of a specific ECU is targeted for acquisition allows to acquire a log according to the intention of the operator, such as intensively monitoring and analyzing an attack on the specific ECU. The setting of the log acquisition requirement can be flexibly performed by combining with the log monitoring requirement including the above control message.

As illustrated in FIG. 11B, the monitoring center 1 may collectively transmit a plurality of pieces of information on the log acquisition requirement to the vehicle 2.

The following is disclosed with respect to the above embodiments.

A log acquisition method executed by an on-vehicle device capable of communicating with a server and mounted on a vehicle, the log acquisition method comprising:

receiving, from the server, a log acquisition requirement including an anomaly detected point portion that designates one or more anomaly detected points and a log acquisition target portion that indicates one or more logs to be acquired when an anomaly is detected at the anomaly detected point designated by the anomaly detected point portion;

storing the log acquisition requirement;

detecting an anomaly of the vehicle;

acquiring, when an anomaly is detected, a log based on a part where an anomaly is detected and a log acquisition requirement stored; and transmitting the acquired log to a server.

While the embodiments of the present disclosure have been described above, the embodiments described above have been presented by way of example only, and are not intended to limit the scope of the invention. These novel embodiments may be practiced in a variety of other forms, and various omissions, substitutions and changes may be made to an extent without departing from the spirit of the invention. These novel embodiments and variations thereof are included in the scope and spirit of the invention, and are also included in the invention described in the claims and the scope of equivalents thereof. Further, the components throughout different embodiments and modifications may be combined as appropriate.

The notation " . . . unit" in the above-described embodiments may be replaced with other notations such as " . . . circuitry", " . . . assembly", " . . . device", " . . . unit", or " . . . module".

In each of the above embodiments, an example in which the present disclosure is configured using hardware has been described, but the present disclosure can also be implemented by software in cooperation with hardware.

Each of functional blocks used for the description of each of the above embodiments is typically implemented as an LSI which is an integrated circuit. The integrated circuit controls each of functional blocks used for the description of the above embodiments, and may include an input terminal and an output terminal. These may be individually formed into one chip, or may be formed into one chip so as to include a part or all. The integrated circuit is herein referred to as an LSI, but may be referred to as an IC, a system LSI, a super LSI, or an ultra LSI, depending on a difference of a degree of integration.

The method of circuit integration is not limited to an LSI, and may be implemented by using a dedicated circuit or a general-purpose processor and memory. Circuit integration may use a field programmable gate array (FPGA) that is programmable after manufacture of an LSI or a reconfigurable processor in which connections or settings of circuit cells within the LSI are reconfigurable.

Further, if an integrated circuit technology that replaces the LSI appears due to the progress of the semiconductor technology or another derived technology, the functional blocks may be obviously integrated by using the technology. For example, application of biotechnology is also a possibility.

The effects in the embodiments described herein are merely examples and are not limited, and may have other effects.

According to the on-vehicle device according to the present disclosure, it is possible to efficiently collect appropriate log information.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An on-vehicle device capable of communicating with a server and mounted on a vehicle, the on-vehicle device comprising:

a memory; and a hardware processor coupled to the memory, the hardware processor being configured to:

receive, from the server, a log acquisition requirement including an anomaly detected point portion that designates one or more anomaly detected points and a log acquisition target portion that indicates one or more logs to be acquired when an anomaly is detected at the one or more anomaly detected points designated by the anomaly detected point portion;

store the log acquisition requirement;

detect the anomaly of the vehicle;

acquire, when detecting the anomaly, a log based on a part where the anomaly is detected and the log acquisition requirement; and transmit the log to the server, wherein the hardware processor is configured to, when the log acquisition requirement includes a plurality of log acquisition requirements corresponding to the anomaly, determine the log to be acquired based on priority levels set to the plurality of log acquisition requirements corresponding to the anomaly.

2. The on-vehicle device according to claim 1, wherein the anomaly detected point portion of the log acquisition requirement includes an electronic control unit (ECU).

3. The on-vehicle device according to claim 1, wherein the anomaly detected point portion of the log acquisition requirement includes one based on an anomaly type.

4. The on-vehicle device according to claim 1, wherein the log acquisition target portion of the log acquisition requirement includes a log of an electronic control unit (ECU).

5. The on-vehicle device according to claim 1, wherein the log acquisition target portion of the log acquisition requirement includes one based on a log type.

6. The on-vehicle device according to claim 1, wherein the hardware processor is configured to acquire a control message of the log acquisition requirement and edit the log acquisition requirement, based on the control message.

7. The on-vehicle device according to claim 1, wherein the log acquisition requirement further includes reliability level information of the log acquisition requirement, and the hardware processor is configured to, when the log acquisition requirement includes the plurality of log acquisition requirements corresponding to the anomaly, determine the log to be acquired based on the reliability level information of the plurality of log acquisition requirements corresponding to the anomaly.

8. A log management method executed by a server capable of communicating with a vehicle, the log management method comprising:

receiving, from the vehicle, anomaly information including an anomaly detected point portion indicating a part where an anomaly is detected and a log based on detection of the anomaly;

identifying, based on the received anomaly information, a log acquisition target portion indicating the log corresponding to the anomaly; and transmitting a log acquisition requirement including the anomaly detected point and the log acquisition target portion to the vehicle, wherein, in the transmitting, the log acquisition requirement further includes information indicating a reliability level of the log acquisition requirement.

9. The log management method according to claim 8, wherein the anomaly detected point portion of the log acquisition requirement includes an ECU electronic control unit (ECU).

10. The log management method according to claim 8, wherein the anomaly detected point portion of the log acquisition requirement includes one based on an anomaly type.

11. The log management method according to claim 8, wherein the log acquisition target portion of the log acquisition requirement includes the log of an electronic control unit (ECU).

12. The log management method according to claim 8, wherein the log acquisition target portion of the log acquisition requirement includes one based on a log type.

13. The log management method according to claim 8, further comprising transmitting a control message of the log acquisition requirement.

14. The log management method according to claim 8, wherein, in the transmitting, the log acquisition requirement is by an external input.

15. The log management method according to claim 8, wherein a transmission destination of the log acquisition requirement is set to a second vehicle of a same vehicle type as the vehicle from which the anomaly information has been received.

16. An on-vehicle device capable of communicating with a server and mounted on a vehicle, the on-vehicle device comprising:

a memory; and a hardware processor coupled to the memory, the hardware processor being configured to:
receive, from the server, a log acquisition requirement including an anomaly detected point portion that designates one or more anomaly detected points and a log acquisition target portion that indicates one or more logs to be acquired when an anomaly is detected at the one or more anomaly detected points designated by the anomaly detected point portion;
store the log acquisition requirement;
detect the anomaly of the vehicle;
acquire, when detecting the anomaly, a log based on a part where the anomaly is detected and the log acquisition requirement; and
transmit the log to the server, wherein, the hardware processor is further configured to, when the log acquisition requirement includes a plurality of log acquisition requirements corresponding to the anomaly, determine the log to be acquired based on reliability level information of the plurality of log acquisition requirements corresponding to the anomaly.

* * * * *